(No Model.)
J. L. HUMASTON.
APPARATUS FOR PRESERVING MEAT OR FISH.
No. 390,170.                    Patented Sept. 25, 1888.
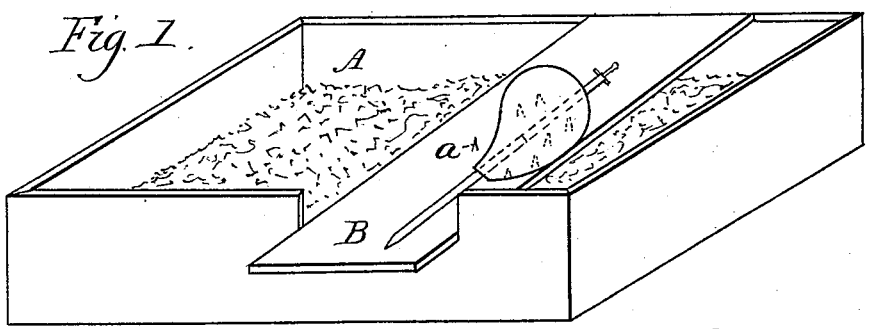
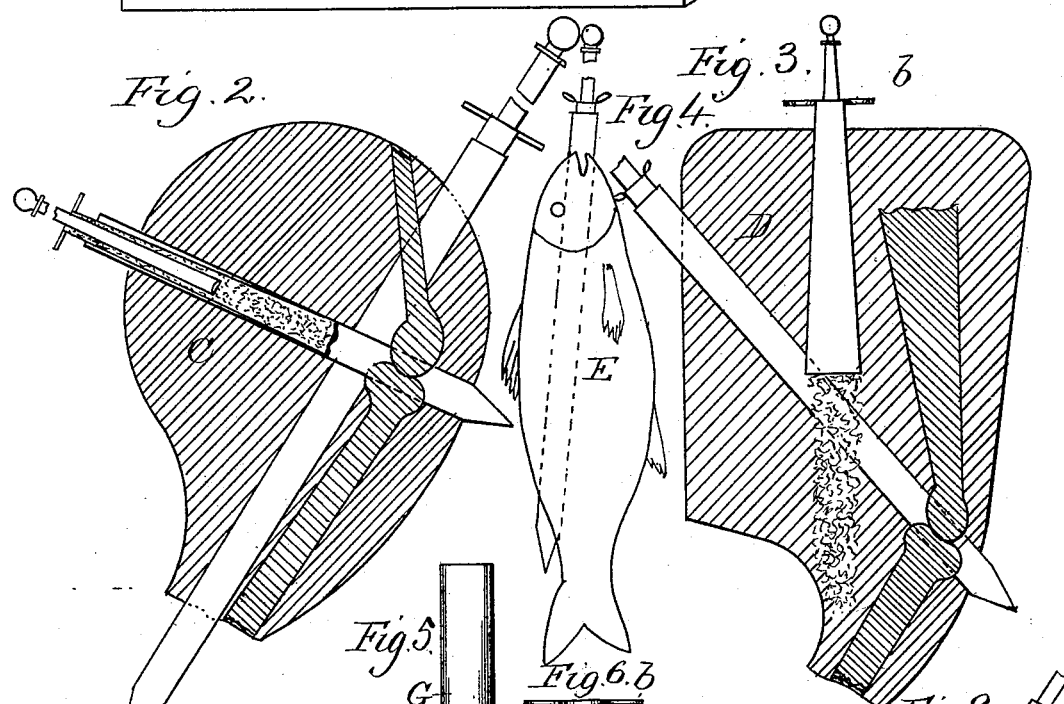
WITNESSES
INVENTOR

United States Patent Office.

JOHN L. HUMASTON, OF TERRE HAUTE, INDIANA.

APPARATUS FOR PRESERVING MEAT OR FISH.

SPECIFICATION forming part of Letters Patent No. 390,170, dated September 25, 1888.

Application filed May 23, 1888. Serial No. 274,779. (No model.)

*To all whom it may concern:*

Be it known that I, JOHN L. HUMASTON, of Terre Haute, in the county of Vigo and State of Indiana, have invented certain new and useful Improvements in the Means of and Method for Preserving Meat and Fish; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to means for preserving and curing flesh meat, fish, and the like, by which the inner body of the meat, fish, &c, is prevented from spoiling or decay; and the object of the invention is to provide an apparatus for depositing a body of preservative or curative substance, or composition of matter, near the bone in the body of the ham, shoulder, quarter, or other portion of the meat or fish to be cured, by which the inner body portion of the meat passes through the process of preservation at the same time the outer surface is passing through the same process, thus equalizing the curing process and preventing the concentration of unaffected juices.

Heretofore hams, shoulders, and the like have been cured by a solution of chloride of sodium or common salt rubbed in or subjected to such treatment, in which nitric acid and potassia (saltpeter) are impregnated, and, as well known, the central portion of the ham or piece of meat, particularly in the region of the bone, is untouched by the curing process, and to provide means to reach this untouched region is the gist of my invention, and by which the gray and unnatural colored spots are avoided and the region about the bone as successfully treated as the outer surface of the meat. The same may be said of fish, particularly when it is intended for shipment and designed to retain its fresh fish flavor, so desirable in parts of the country far from sea-ports.

In the drawings hereto annexed, Figure 1 is a perspective view of a salt-box adapted for my purpose. Fig. 2 shows a longitudinal section of a ham, showing the method of depositing the salt or other curative substance. Fig. 3 is a horizontal section of a shoulder of pork, illustrating my device for depositing the salt. Fig. 4 shows fish in which the salt is deposited. Figs. 5, 6, and 7 are detached portions of the complete device, as shown in section in Fig. 2; Fig. 8, a cut of beef, and Fig. 9 a cross section of the instrument.

A is the salt-box, in which the salt is kept for immediate use, and across this box, at an inclined position, I locate a ham or other meat to be cured, as shown. The board B is provided with prickers or projections $a$, which are sharpened to prevent the meat from sliding while undergoing the process of inserting the salt. The inclination of the board B is designed to be in line with the body of the operator when in a partially-stooped position, and also to let the piece of meat when finished slide off into a receptacle provided for the purpose.

C is a ham, with the device shown in position to deposit the salt in that portion of the meat desired, and D a shoulder in like position for like purpose.

E is a fish, also showing the depositor, and F is a cut of beef for the same purpose.

The object of all these different features is to show the general adaptability and utility of the invention.

Figs. 5, 6, and 7 show, respectively, the outer casing, the salt-carrying tube, and the plunger. The casing G is parallel and provided with a point or spear, by which it is directed through the meat at the point desired.

The salt-carrying tube H is preferably tapering from the outer to the inner end. The object of making the inner end larger is that it prevents the salt from packing when the plunger is inserted, and will readily loosen as the tube is withdrawn and fall out of the tube and remain in the space formed by the probe or piercer after it is withdrawn. The plunger, Fig. 7, is also larger at its inner end, so that when it is inserted in the salt-carrying tube it will clear itself. It is provided at its extreme end with a conical concave cavity, whereby as it is pushed in it will concentrate the salt nearer the center of the tube instead of pushing it to one side, as it would do if pointed.

The tube H is provided with bails or rings $b\ b$, by means of which it is withdrawn from the meat. While the device is shown as being inserted near the bone, or that part of the meat most usually affected, it may be inserted at any portion of the ham or meat and the salt deposited there.

It must be understood that after the device is charged and inserted in the meat and the tube G drawn out from the opposite side the tube H must be taken hold of by the handles and steadily withdrawn, while the plunger remains in a comparatively stationary position, so that the salt is deposited and distributed equally along the walls of the cavity, as shown.

It will be understood that when the salt is deposited the juices of the meat very soon dissolve with the salt and immediately form a brine, so that the meat is subjected to curative processes within and without at the same time.

The operation is as follows: Salt being placed in the box A and the board B being in position, the tube H is charged with salt or other mixture and inserted in the prober or piercing-tube G, and the plunger I being in position, the tube G is then inserted in the meat where desired and pushed through until it is withdrawn from the opposite side, leaving the tube H within the meat. The operator now grasps the handle b b and draws the tube H toward him, the plunger forcing the salt out as the tube is extracted and leaving it in the cavity or aperture in the meat. This operation is repeated as often as required.

What I claim is—

1. The combination, in an instrument for depositing curative remedies in the body of meats, of the outer hollow probe or piercer, the inner carrying-tube, and the plunger, operating together in the manner shown and described.

2. The combination, in an instrument for conveying salt or other remedies to seats of decay, ordinarily such as hams and the like, of the probe or piercer, pointed as shown, the tapering inner tube, and the plunger, as described.

3. The combination, in an instrument for conveying antiseptic remedies to the inner portion of meat, preferably near the bone, of the piercer, the conveying-tube larger at its inner end, and the plunger concaved at its inner end and arranged in such manner that the piercer and conveying-tube are extracted in opposite directions in the manner shown.

In testimony that I claim the foregoing as my own I affix my signature in presence of two witnesses.

JOHN L. HUMASTON.

Witnesses:
 OWEN E. DUFFY,
 HUBERT E. PECK.